US012120685B2

(12) United States Patent
Yang et al.

(10) Patent No.: US 12,120,685 B2
(45) Date of Patent: Oct. 15, 2024

(54) DIRECT CURRENT LOCATION REPORTING IN SIDELINK

(71) Applicant: QUALCOMM Incorporated, San Diego, CA (US)

(72) Inventors: Wei Yang, San Diego, CA (US); Wanshi Chen, San Diego, CA (US); Seyedkianoush Hosseini, San Diego, CA (US); Gabi Sarkis, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 402 days.

(21) Appl. No.: 17/528,007

(22) Filed: Nov. 16, 2021

(65) Prior Publication Data

US 2023/0156706 A1 May 18, 2023

(51) Int. Cl.
*H04W 72/20* (2023.01)
*H04W 72/044* (2023.01)
*H04W 76/14* (2018.01)

(52) U.S. Cl.
CPC ......... *H04W 72/20* (2023.01); *H04W 72/044* (2013.01); *H04W 76/14* (2018.02)

(58) Field of Classification Search
CPC .... H04W 72/20; H04W 76/14; H04W 72/044
See application file for complete search history.

(56) References Cited

U.S. PATENT DOCUMENTS

| 5,710,998 | A * | 1/1998 | Opas | H04B 1/40 |
| | | | | 455/208 |
| 2004/0123106 | A1 * | 6/2004 | D'Angelo | G06F 21/35 |
| | | | | 713/171 |
| 2009/0322425 | A1 * | 12/2009 | Shako | H03F 1/34 |
| | | | | 330/149 |
| 2013/0270424 | A1 * | 10/2013 | Van Der Zanden | G01S 13/87 |
| | | | | 250/221 |
| 2018/0091350 | A1 * | 3/2018 | Akkarakaran | H04L 27/26134 |
| 2018/0332619 | A1 * | 11/2018 | Manolakos | H04W 74/0825 |
| 2018/0375705 | A1 * | 12/2018 | Gaal | H04L 27/2646 |
| 2019/0254013 | A1 * | 8/2019 | Chang | H04L 5/00 |

(Continued)

FOREIGN PATENT DOCUMENTS

EP 3905842 A1 11/2021
WO WO-2017155330 A1 * 9/2017 ......... H04L 27/2602

(Continued)

OTHER PUBLICATIONS

International Search Report and Written Opinion—PCT/US2022/077011—ISA/EPO—Dec. 21, 2022.

(Continued)

*Primary Examiner* — Kenny S Lin
(74) *Attorney, Agent, or Firm* — Harrity & Harrity LLP / Qualcomm

(57) ABSTRACT

Various aspects of the present disclosure generally relate to wireless communication. In some aspects, a first user equipment (UE) may communicate, with a second UE, information indicating a direct current (DC) location for a communication link between the first UE and the second UE. The UE may communicate a sidelink communication with the second UE via the communication link based at least in part on the DC location. Numerous other aspects are described.

30 Claims, 7 Drawing Sheets

(56) References Cited

U.S. PATENT DOCUMENTS

| | | | | |
|---|---|---|---|---|
| 2019/0313394 A1* | 10/2019 | Kubota | ................ | H04W 72/21 |
| 2020/0296550 A1* | 9/2020 | Akkarakaran | ........ | G01S 5/0036 |
| 2021/0392537 A1* | 12/2021 | Da Silva | ............... | H04W 76/25 |
| 2022/0078670 A1* | 3/2022 | Kung | ................ | H04W 74/0833 |
| 2022/0110124 A1* | 4/2022 | Wang | ................ | H04L 5/0091 |
| 2022/0263628 A1* | 8/2022 | Liu | ....................... | H04L 5/0053 |
| 2023/0034338 A1* | 2/2023 | Kumar | ................ | H04L 27/2657 |
| 2023/0128512 A1* | 4/2023 | Kumar | ............... | H04W 74/0833 |
| 2023/0388066 A1* | 11/2023 | Bergström | .............. | H04L 5/001 |
| 2024/0064739 A1* | 2/2024 | Falkenberg | ........... | H04W 72/20 |

FOREIGN PATENT DOCUMENTS

| | | |
|---|---|---|
| WO | WO-2019061180 A1 | 4/2019 |
| WO | WO-2020092345 A1 | 5/2020 |
| WO | WO-2022076430 | 4/2022 |

OTHER PUBLICATIONS

VIVO: "Remaining Issues on Physical Layer Structure for NR Sidelink", 3GPP TSG-RAN WG1 Meeting #102-e, R1-2005338, 3rd Generation Partnership Project, Mobile Competence Centrem, 650, Route Des Lucioles, F-06921 Sophia-Antipolis Cedex, France, vol. Ran WG1, No. e-Meeting, Aug. 17, 2020-Aug. 28, 2020 Aug. 8, 2020, XP051917363, pp. 1-9.

* cited by examiner

DIRECT CURRENT LOCATION REPORTING IN SIDELINK

FIELD OF THE DISCLOSURE

Aspects of the present disclosure generally relate to wireless communication and to techniques and apparatuses for direct current (DC) location reporting in the sidelink.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first user equipment (UE). The method may include communicating, with a second UE, information indicating a direct current (DC) location for a communication link between the first UE and the second UE. The method may include communicating a sidelink communication with the second UE via the communication link based at least in part on the DC location.

Some aspects described herein relate to a non-transitory computer-readable medium that stores a set of instructions for wireless communication by a first UE. The set of instructions, when executed by one or more processors of the UE, may cause the UE to communicate, with a second UE, information indicating a DC location for a communication link between the first UE and the second UE. The set of instructions, when executed by one or more processors of the UE, may cause the UE to communicate a sidelink communication with the second UE via the communication link based at least in part on the DC location.

Some aspects described herein relate to an apparatus for wireless communication. The apparatus may include means for communicating, with a UE, information indicating a DC location for a communication link between the apparatus and the UE. The apparatus may include means for communicating a sidelink communication with the UE via the communication link based at least in part on the DC location.

Some aspects described herein relate to a first UE for wireless communication. The first UE may include a memory and one or more processors coupled to the memory. The one or more processors may be configured to communicate, with a second UE, information indicating a DC location for a communication link between the first UE and the second UE. The one or more processors may be configured to communicate a sidelink communication with the second UE via the communication link based at least in part on the DC location.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
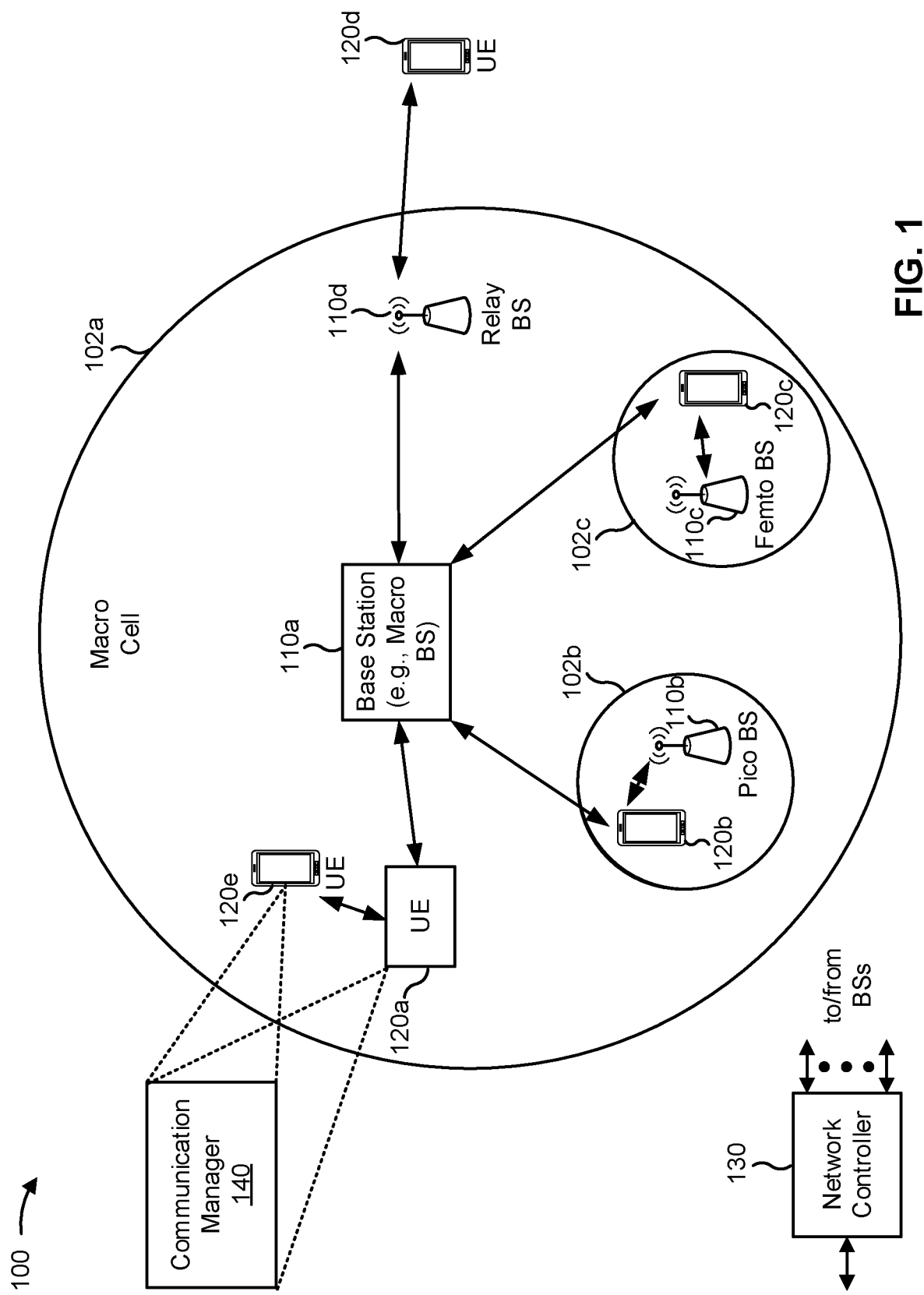
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may communicate, with a second UE, information indicating a direct current (DC) location for a communication link between the first UE and the second UE; and communicate a sidelink communication with the second UE via the communication link based at least in part on the DC location. Additionally, or alternatively, the communication manager 140 may perform one or more other operations described herein.

As indicated above, FIG. 1 is provided as an example. Other examples may differ from what is described with regard to FIG. 1.

Figure 2:
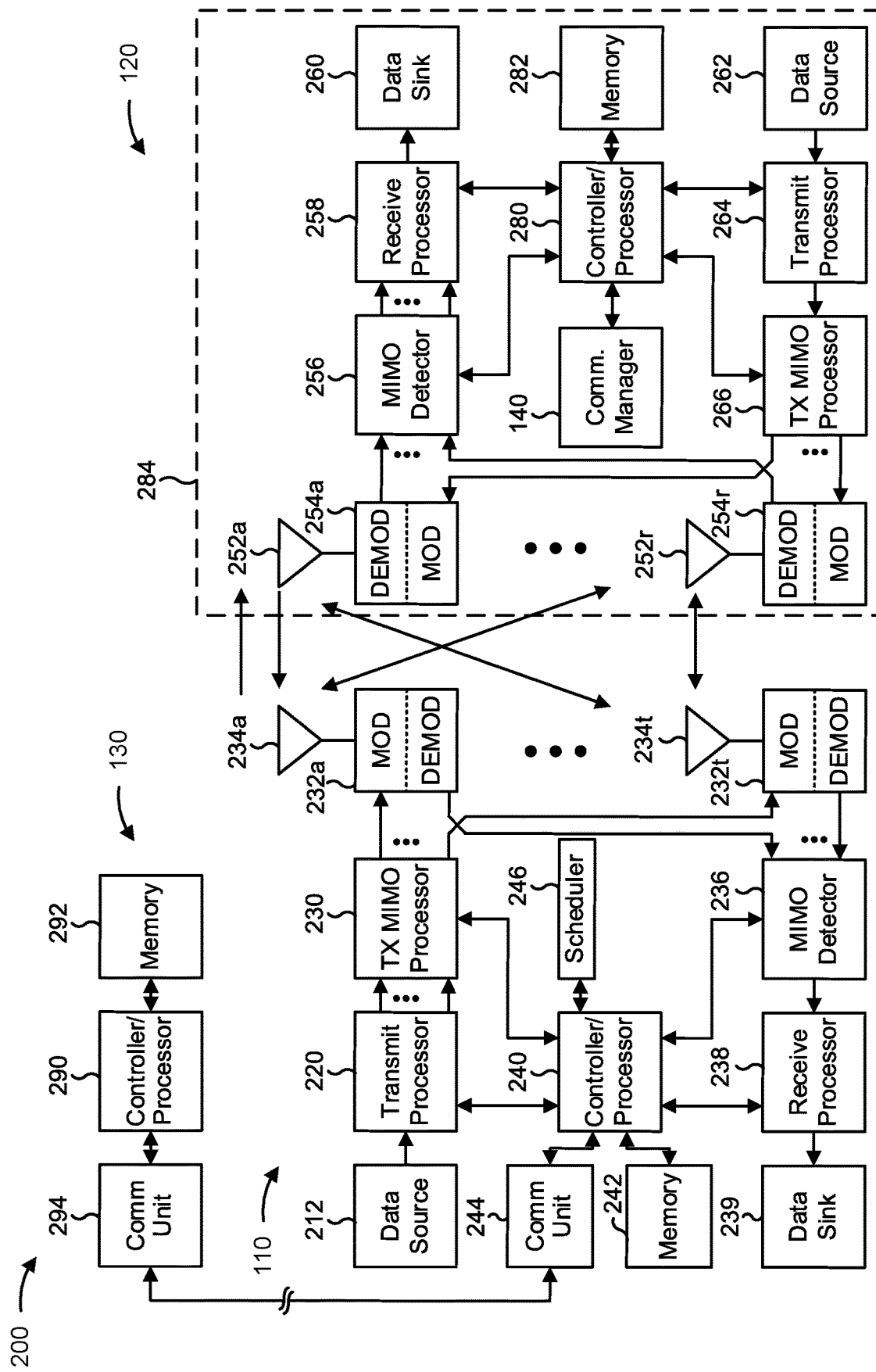
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-7).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-7).

The controller/processor 240 of the base station 110, the controller/processor 280 of the UE 120, and/or any other component(s) of FIG. 2 may perform one or more techniques associated with direct current location reporting in the sidelink, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, and/or other processes as described herein. In some examples, executing instructions may include running the instructions, converting the instructions, compiling the instructions, and/or interpreting the instructions, among other examples.

In some aspects, the UE 120 includes means for communicating, with a second UE, information indicating a direct current (DC) location for a communication link between the first UE and the second UE; and/or means for communicating a sidelink communication with the second UE via the communication link based at least in part on the DC location. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
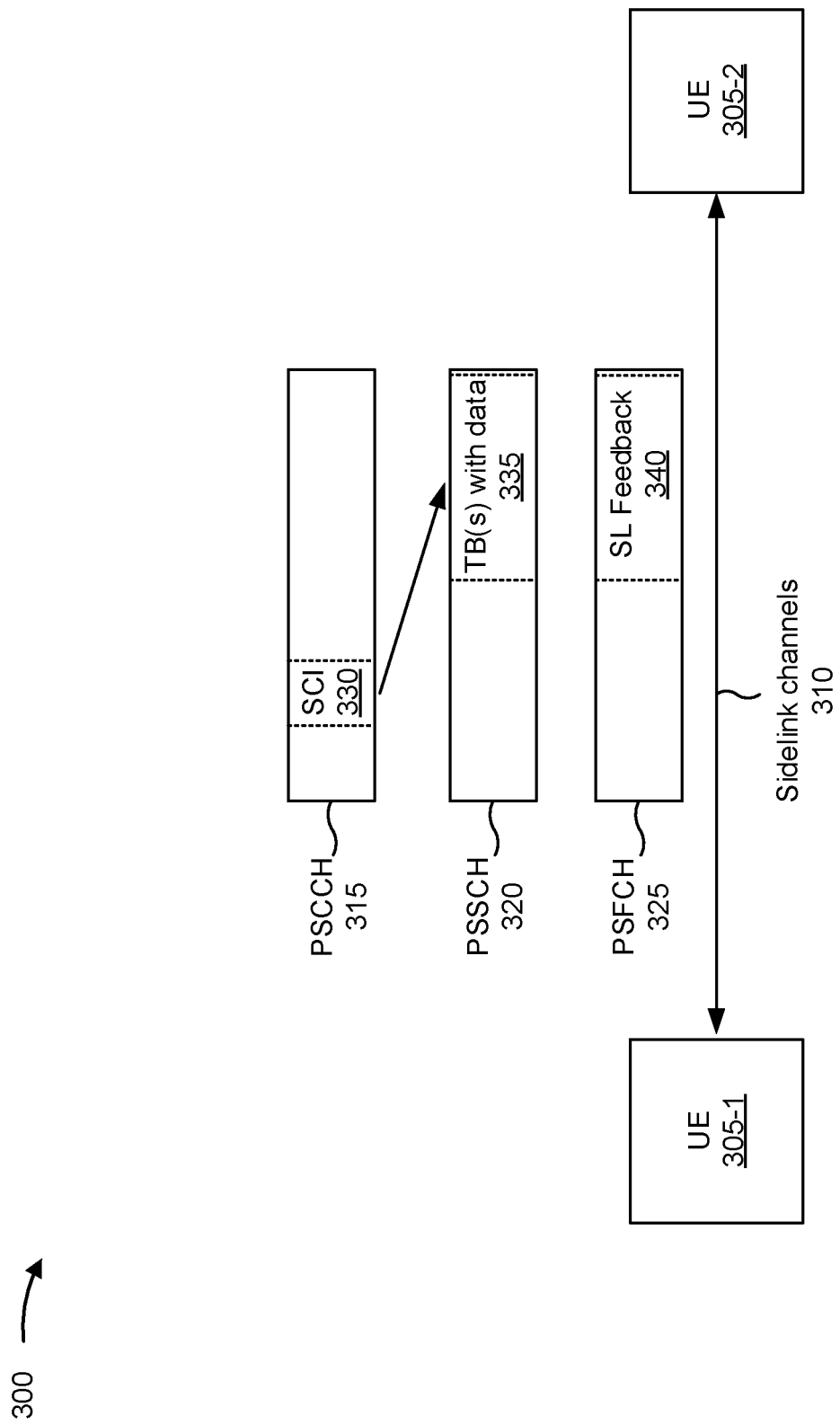
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger.

In some aspects, the one or more sidelink channels 310 may use resource pools. A scheduling assignment (e.g., included in SCI 330) may be transmitted in sub-channels using specific resource blocks (RBs) across time, which may be included in a resource pool. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a base station 110. For example, the UE 305 may receive a grant (e.g., in downlink control information (DCI) or in a radio resource control (RRC) message, such as for configured grants) from the base station 110 for sidelink channel access and/or scheduling. In some aspects, a UE 305 may operate using a transmission mode (e.g., Mode 2) where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

In some cases, the UEs 305 may communicate based at least in part on a DC location. For example, the DC location may be determined by a transmitting UE of the UEs 305 and signaled to a receiving UE of the UEs 305. As another example, the DC location may be selected from multiple potential DC locations, which may be configured by the network or may be preconfigured.

As indicated above, FIG. 3 is provided as an example. Other examples may differ from what is described with respect to FIG. 3.

Figure 4:
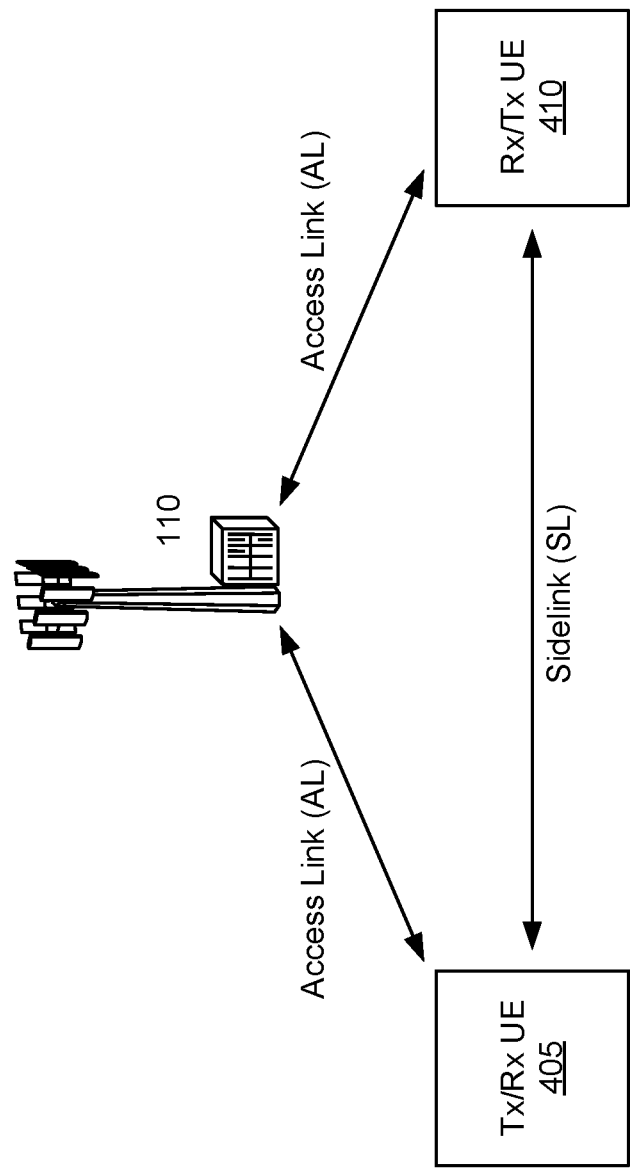
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first radio access link. Additionally, or alternatively, in some sidelink modes, the base station 110 may communicate with the Rx/Tx UE 410 via a second radio access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link or a radio access link. Sidelink communications may be transmitted via the sidelink, and access link communications may be transmitted via the radio access link. An access link communication may be either a downlink communication (from a base station 110 to a UE 120) or an uplink communication (from a UE 120 to a base station 110). Both access link communications and sidelink communications are associated with a DC location, as described in more detail below. The techniques and apparatuses described herein provide for selection and signaling of a DC location for sidelink UEs (e.g., UE 410), such as to support communication via multiple sidelink component carriers or multiple bandwidth parts.

As indicated above, FIG. 4 is provided as an example. Other examples may differ from what is described with respect to FIG. 4.

A transmitter (such as a UE or a base station) may generate a baseband signal for transmission of communications. The baseband signal may include a plurality of subcarriers, and each subcarrier may have a respective frequency as a function of a subcarrier spacing. One of the subcarriers may have a frequency of 0 (zero) Hz in the baseband. The subcarrier at the frequency of 0 Hz may be referred to as a direct current (DC) subcarrier. The baseband signal can be considered to have a center at the DC subcarrier. Each of the subcarriers may correspond to or be a tone, and the tone corresponding to the DC subcarrier may be referred to as a DC tone. For transmission, the transmitter may mix the baseband signal to a radio frequency (RF) signal such that the center of the baseband signal (that is, the DC subcarrier) is shifted to the center frequency of an RF channel. The center frequency of the RF channel (which is where the DC subcarrier is located) is referred to herein as a DC location. For clarity, it is noted that the center frequency of the RF channel does not necessarily coincide with the center frequency of a carrier or bandwidth part used for communication, and can even occur outside of the carrier or the bandwidth part.

There is generally some degree of leakage (such as from the local oscillator) at the DC tone. Therefore, signal quality at the DC tone is generally worse than at other frequency locations, which can impact reference signal quality and data communication quality if the reference signal or the data communication includes the DC tone. Some radio access technologies (RATs) (such as LTE) disallow data transmission at the DC tone in order to mitigate the impact of the leakage. Some other RATs, such as NR, permit data transmission at the DC tone, for example, on the assumption that a receiver can adequately filter leakage at the DC tone. On a radio access link (that is, the uplink or the downlink, associated with a Uu interface), a base station and a UE may communicate with one another regarding the DC tone. For example, for the downlink, the base station may determine a DC location of the DC tone for a given cell (e.g., carrier) and may signal the DC location to the UE. As used herein, a DC location identifies a location of the DC tone. For the uplink, the UE may determine (e.g., select) the DC location for a given cell, and may report the DC location to the base station. The UE may retune one or more RF components, such as an RF front end (RFFE), according to the DC location in order to improve RF performance. For example, the UE may perform RF filtering, power saving operations, or the like, based at least in part on the DC location.

Sidelink transmissions, which may be performed on a sidelink communication link, may be associated with a DC location. In some deployments, the DC location for a sidelink cell or bandwidth part (BWP) (and thus for all resource pools in the sidelink cell or BWP) may be configured or preconfigured for all UEs communicating on the sidelink cell or BWP. As used herein, "preconfiguration" may include a configuration that is provided to the UE during manufacturing, software update, or the like, and "configuration" may include a configuration provided to the UE by a base station or another UE (such as RRC configuration or the like). However, the network configuration may not always properly configure the DC location for a sidelink cell or BWP. For example, the network may not always configure the DC location, the network may indicate that the DC location is undetermined for a sidelink cell or BWP, or an indicated DC location may not be accurate for a sidelink communication between UEs. Accordingly, the DC location may be ambiguous and/or not as accurate a DC location for the sidelink communication as a DC location selected by a UE, thereby resulting in degraded tuning, filtering, or signal quality in sidelink communications.

Moreover, network configuration of DC locations for sidelink communication may be more practical for deployments or RATs where only a single sidelink cell or BWP can be configured for a UE due to the overhead cost of signaling the DC locations. However, some deployments or RATs may support carrier aggregation (in which a UE communicates using multiple sidelink component carriers) and/or multiple sidelink BWPs per sidelink carrier. "Component carrier" and "carrier" may be used interchangeably with "cell" herein.

Some difficulties may arise for sidelink communication if a single DC location is configured or preconfigured for sidelink UEs that are capable of supporting carrier aggregation or multiple BWPs within a sidelink carrier. As a first example, different UEs may support different combinations of carriers. Configuring DC locations for all possible combinations of carriers may involve significant overhead and complexity for the network, and this overhead and complexity may be exacerbated if a UE supports multiple BWPs per carrier. Still further, if two sidelink carriers are in different bands, then the UE may use multiple power amplifies to support the different combinations carriers in the different bands. Each power amplifier may be associated with a respective DC location resulting in multiple DC locations and multiple possible DC location configurations, thereby further increasing complexity and overhead to signal all possible configurations.

As a second example, different UEs may have different implementations for supporting carrier aggregation on the sidelink. For example, a first UE may use a single power amplifier for multiple component carriers, whereas a second UE may use multiple power amplifiers to support multiple component carriers. In this example, a preconfiguration or configuration of a DC location that applies to both the first UE and the second UE may not be feasible.

As a third example, if two component carriers are managed by different entities (e.g., a first component carrier is managed by a gNB and a second component carrier is managed by a different entity), it may be unsuitable for the same entity to determine a DC location for the two component carriers. Thus, configuration or preconfiguration of a DC location for sidelink UEs, such as sidelink UEs utilizing multiple component carriers or multiple sidelink BWPs on one or more component carriers, causes significant overhead and complexity, and may be difficult or impossible in some scenarios.

Some techniques and apparatuses described herein provide signaling of one or more DC locations between sidelink UEs to support sidelink communication between the sidelink UEs. Signaling a DC location among sidelink UEs may reduce ambiguity or increase accuracy of the DC location associated with a sidelink communication. Moreover, signaling a DC location among UEs may reduce overhead and complexity relative to preconfiguration or network configuration of DC locations for sidelink communications. Some aspects described herein provide signaling of DC locations of multiple carriers, such as per carrier or per bandwidth part utilized by a sidelink UE, which reduces overhead relative to signaling DC locations of all possible combinations of carriers. Furthermore, a sidelink UE may select one or more DC locations for sidelink communication, which simplifies the determination of DC locations for UEs with different configurations of power amplifiers or component carriers. Still further, if a UE selects its own one or more DC locations, implementation of sidelink communication and selection of DC locations may be simplified in the case where multiple component carriers are managed by different entities.

While some techniques described herein are described with regard to UEs utilizing multiple sidelink carriers or multiple BWPs on a sidelink carrier, these techniques can also be applied for UEs configured with a single sidelink carrier and/or a single sidelink BWP. Furthermore, "sidelink carrier" is used interchangeably with "carrier" herein. Still further, "sidelink cell" is used interchangeably with "cell" herein, unless indicated otherwise. Further, "sidelink BWP" is used interchangeably with "BWP" herein.

Figure 5:
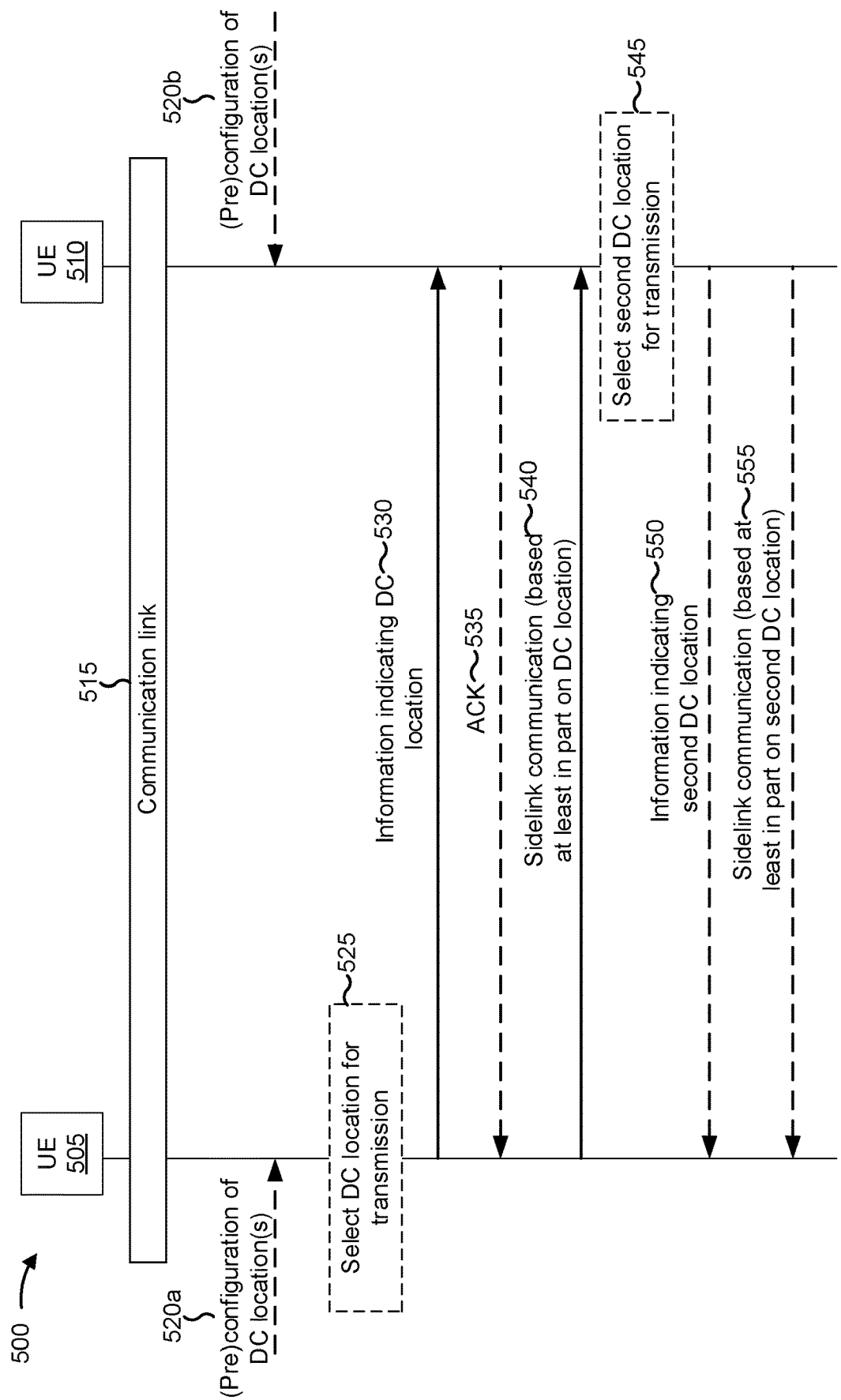
FIG. 5 is a diagram illustrating an example of signaling associated with selecting and communicating direct current locations for sidelink communications, in accordance with the present disclosure.

FIG. 5 is a diagram illustrating an example 500 of signaling associated with selecting and communicating DC locations for sidelink communications, in accordance with the present disclosure. As shown, example 500 includes a UE 505 (e.g., UE 120, UE 305, UE 405, UE 410) and a UE 510 (e.g., UE 120, UE 305, UE 405, UE 410). As further shown by reference number 515, the UE 505 and the UE 510 may be associated with a communication link, which may utilize a sidelink carrier or a sidelink BWP. For example, the UE 505 and the UE 510 may be configured or preconfigured with a sidelink carrier (e.g., cell) or a sidelink bandwidth part to be used for communication between the UE 505 and the UE 510. In some aspects, the UE 505 and the UE 510 may be configured or preconfigured with multiple sidelink carriers (such as for carrier aggregation) and/or multiple BWPs on a sidelink carrier. For example, the UE 505 may be configured with one (or more than one) sidelink carrier for communication with the UE 510 and may be configured with another sidelink carrier for communication with another UE (e.g., a third UE). In some aspects, one of the UEs 505 and 510 may be configured or preconfigured with multiple sidelink carriers or BWPs, and the other of the UEs 505 and 510 may be configured or preconfigured with a single sidelink carrier or BWP. The communication link between the UE 505 and the UE 510 (e.g., the carrier(s) and/or BWP(s)) can be used for unicast communication, groupcast communication (e.g., a groupcast transmission to a defined group of UEs, or a groupcast transmission to a group of UEs whose identities are unknown to the transmitter), and/or broadcast communication. In FIG. 5, dashed lines indicate optional steps.

As shown in FIG. 5, and by reference numbers 520a and 520b, in some aspects, the UE 505 and/or the UE 510 may be configured or preconfigured with one or more DC locations. For example, in some aspects, a base station (e.g., base station 110) may transmit, to the UE 505 and/or the UE 510, information indicating one or more DC locations. As another example, the UE 505 and/or the UE 510 may be preconfigured with the information indicating the one or more DC locations. In some aspects, the information indicating one or more DC locations may indicate a common DC location. A common DC location is a DC location configured for multiple UEs. A common DC location may be associated with a communication link (e.g., a carrier or a bandwidth part). In some aspects, the information indicating the one or more DC locations may indicate a DC location within a carrier. In some aspects, the information indicating the one or more DC locations may indicate multiple DC locations, such as a corresponding DC location within each of multiple carriers. In some aspects, the information indicating the one or more DC locations may indicate an undetermined DC location. In some aspects, a UE (e.g., the UE 505 and/or the UE 510) may select a DC location based at least in part on the configuration or the preconfiguration, or may use one or more of the DC locations indicated by the configuration or the preconfiguration, as described in more detail below.

As shown by reference number 525, in some aspects, the UE 505 may select a DC location for a transmission. For example, a transmitting UE may select a DC location, and may signal information indicating the DC location to a receiving UE, as described below. The UE 505 is the transmitting UE in the operations associated with reference numbers 525, 530, 535, and 540. The UE 510 is the transmitting UE in the operations associated with reference numbers 545, 550, and 555, as described below. Thus, for a communication link, the DC location can be considered to be per direction. For example, different DC locations can be selected for transmission from the UE 505 to the UE 510, and for transmission from the UE 510 to the UE 505.

In some aspects, the UE 505 may select a DC location based at least in part on a carrier configured for the UE 505. For example, the UE 505 may select a DC location within a carrier configured for the UE 505 and the UE 510. In some aspects, if the UE 505 is configured with a first carrier and a second carrier on the sidelink, then the UE 505 may select a DC location within one of the two carriers. In this example, if the first carrier is associated with the UE 510 and the second carrier is associated with a third UE, the UE 505 may transmit information indicating the DC location to the UE 510, and may transmit information indicating that the DC location is outside of the second carrier to the third UE. As used herein, "information indicating a DC location" can include information indicating a DC location with a carrier (e.g., a DC subcarrier index within the carrier), information indicating that a DC location is outside of a carrier, information indicating that a DC location is outside each carrier of a set of carriers (as described below) and information indicating that a DC location is undetermined.

In some aspects, the UE 505 may select a DC location outside of each of the carriers associated with the DC location. For example, the UE 505 may select, for a group of carriers, a DC location that is not included within any carrier of the group of carriers. In this example, the DC location signaled by the UE 505 may indicate that the DC location is outside of each of the set of carriers. For example, the UE 505 may provide a respective indication, for each carrier of the set of carriers, that the DC location is outside of each carrier. As another example, the UE may provide an indication that jointly indicates that the DC location is outside of each of the set of carriers.

In some aspects, the UE 505 may select a DC location for the communication link. In some aspects, the DC location may apply to unicast communications or managed groupcast communications (e.g., communications to a defined set of UEs). For example, the DC location may apply to a communication link in which a sidelink radio resource control (RRC) (e.g., PC5 RRC) session is established. In some aspects, the DC location may not apply to group-less groupcast communications or broadcast communications (e.g., communications for which a sidelink RRC session is not established), as described in more detail elsewhere herein. For group-less groupcast communications, a configured or preconfigured DC location may be selected as the DC location, thereby reducing signaling resource consumption at the UE 505. For example, the transmitting UE may always follow the indication from the network, such that the transmitting UE does not need to signal the DC location to the receiving UE, which reduces overhead.

In some aspects, the UE 505 may select a configured or preconfigured DC location as the DC location, or may select the DC location based at least in part on a configuration or preconfiguration. Thus, it may be said that whether the UE 505 uses a common DC location (preconfigured or configured by a base station) or a DC location determined by the UE 505 (e.g., a UE specific DC location) can be under the control of a network or the preconfiguration. For example, in some aspects, if a DC location is configured or preconfigured in a carrier, then UEs configured with the carrier (e.g., the UE 505 and the UE 510) may use the DC location. For example, the UEs may use the configured or preconfigured DC location as a default, but the UEs may have an option to override the DC location. As another example, if a DC location is configured or preconfigured in a carrier, then UEs configured with the carrier (e.g., the UE 505 and the UE 510) must use the DC location, and the UEs do not have an option to override or use a different DC location (e.g., a UE selected DC location). In some aspects, if a DC location is not configured or preconfigured, or if the DC location is configured or preconfigured as undetermined, the UE 505 (e.g., the transmitting UE) may select a DC location, and may signal the DC location to the UE 510 (e.g., the receiving UE). In some aspects, the UE 505 may determine whether to use a preconfigured or configured DC location, or to select a DC location (e.g., a UE specific DC location) other than a configured or preconfigured DC location, based at least in part on a cast type of a communication. For example, the UE 505 may select a DC location other than a configured or preconfigured DC location for a unicast communication or a managed groupcast communication. As another example, the UE 505 may select a DC location other than a configured or preconfigured DC location based at least in part on having established a sidelink RRC session with the UE 510. Thus, the UE 505 (e.g., the transmitting UE) may override a network-configured or preconfigured DC location for unicast communications, for managed groupcast communications, or after a PC5 RRC session between the UE 505 and the UE 510 (e.g., the receiving UE) has been established. In this way, the UE 505 may select a more suitable DC location than is configured or preconfigured for the UE 505, which may reduce leakage, increase throughput, and improve communication between the UE 505 and the UE 510. As mentioned above, in some aspects, the UE 505 may select a preconfigured or configured DC location for a groupcast communication (e.g., to a group of UEs unknown to the UE 505) or a broadcast communication.

In some aspects, the UE 505 (e.g., a transmitting UE) may be configured or preconfigured with multiple DC locations, such as a DC location in each of multiple carriers configured for (e.g., supported by) the UE 505. The multiple carriers may be a group of carriers (e.g., a cell group, a carrier aggregation configuration, or the like). In such examples, the UE 505 may select a DC location included in one of the multiple carriers as a DC location for all of the multiple carriers. For example, the DC location for the multiple carriers may be selected from the per-carrier DC locations indicated by the configuration or preconfiguration. In this way, backward compatibility is improved while providing some flexibility for the UE 505 to select a suitable DC location.

As shown by reference number 530, the UE 505 (e.g., the transmitting UE) may transmit information indicating the DC location. For example, the UE 505 may transmit information indicating the DC location for the communication link. In some aspects, the UE 505 may transmit the information indicating the DC location using sidelink RRC (e.g., PC5 RRC) signaling. In some aspects, the UE 505 may transmit the information indicating the DC location using medium access control (MAC) signaling, such as a PC5 MAC control element (MAC-CE). In some aspects, the information indicating the DC location may be per sidelink BWP. For example, the information indicating the DC location may indicate, for one or more sidelink BWPs, one or more corresponding DC locations (e.g., one DC location per sidelink BWP). In some aspects, the information indicating the DC location may be per cell (e.g., per carrier). For example, the information indicating the DC location may indicate, for one or more sidelink cells (e.g., sidelink carriers), one or more corresponding DC locations (e.g., one DC location per cell). In some other aspects, the information indicating the DC location may be per group of carriers. For example, the information may indicate a DC location inside a carrier of the group of carriers, a DC location outside of all carriers of the group of carriers, or an unspecified DC location for the group of carriers. Providing information per group of carriers may lower overhead relative to providing information separately for each carrier, whereas providing information separately for each carrier may simplify signaling.

In some aspects, the UE 505 (e.g., the transmitting UE) may transmit the information indicating the DC location during sidelink RRC connection establishment (e.g., based at least in part on performing sidelink RRC connection establishment). In some aspects, the UE 505 may transmit the information indicating the DC location during sidelink connection reestablishment (e.g., based at least in part on performing sidelink RRC connection reestablishment). In some aspects, the UE 505 may transmit the information indicating the DC location based at least in part on a BWP switch. For example, the UE 505 may transmit the information indicating the DC location upon performing a BWP switch in any carrier configured for the UE 505 or upon receiving a trigger to perform the BWP switch. In some aspects, the UE 505 may transmit the information indicating the DC location based at least in part on a BWP reconfiguration. For example, the UE 505 may transmit the information indicating the DC location upon performing BWP reconfiguration, or upon receiving an updated BWP configuration. Thus, the UE 505 may provide an updated (or an initial) DC location for an updated or reconfigured communication link or BWP.

As shown by reference number 535, in some aspects, the UE 505 (e.g., the transmitting UE) may receive an acknowledgment of the information indicating the DC location. For example, in some aspects, the UE 510 (e.g., the receiving UE) may transmit an acknowledgment (e.g., via a physical sidelink feedback channel (PSFCH), an RRC message, a MAC-CE message, or the like) for the information indicating the DC location. In some aspects, the UE 510 may use the DC location based at least in part on the acknowledgment. For example, the DC location may become effective (e.g., may be used for transmissions of the transmitting UE) after the acknowledgment is received. In some aspects, the UE 510 (e.g., the receiving UE) may begin using the DC location (e.g., may begin performing filtering in accordance with the DC location) after transmitting the acknowledgment. If no acknowledgment is received, in some aspects, the UE 505 may retransmit the information indicating the DC location. Thus, reliability of signaling of DC locations is improved.

In some aspects, the DC location may become effective (e.g., may be used for transmissions of the transmitting UE, or may be used for filtering by the receiving UE) after a length of time, such as a threshold number of milliseconds. For example, the length of time may be measured from a time when the information indicating the DC location is transmitted by the transmitting UE. As another example, the length of time may be measured from a time when the information indicating the DC location is received by the receiving UE. Applying the DC location after the length of time may reduce signaling overhead relative to applying the DC location based at least in part on receiving or transmitting an acknowledgment.

As shown by reference number 540, the UE 505 (e.g., the transmitting UE) may transmit the sidelink communication to the UE 510 (e.g., the receiving UE). The sidelink communication may include any form of communication that can be transmitted on the sidelink. In some aspects, the UE 505 may transmit the sidelink communication based at least in part on the DC location. For example, the UE 505 may transmit the sidelink communication such that a phase tracking reference signal (PTRS) is non-overlapped with a frequency resource (e.g., a subcarrier) at the DC location. As another example, the UE 505 may transmit the sidelink communication such that a demodulation reference signal (DMRS) is non-overlapped with the frequency resource (e.g., the subcarrier) at the DC location. In some aspects, the UE 510 may receive the sidelink communication based at least in part on the DC location. For example, the UE 510 may perform filtering taking into account the DC location such that leakage is mitigated.

In some aspects, a receiving UE (e.g., the UE 510) may not receive information indicating a DC location from a transmitting UE (e.g., UE 505). For example, the transmission of the information may fail, the transmitting UE may not support selection and signaling of a DC location for sidelink communications, or the transmitting UE may determine not to select a DC location (e.g., the transmitting UE may determine that a configured or preconfigured DC location should be used). In some aspects, the receiving UE may use a DC location configured or preconfigured for the receiving UE, as described above. In some other aspects, the receiving UE may determine (e.g., assume) that the DC location is undetermined for purposes of receiving the sidelink communication. In some other aspects, the receiving UE may determine (e.g., assume) that the DC location is outside of a carrier associated with the receiving UE for purposes of receiving the sidelink communication.

Reference numbers 545, 550, and 555 show an example where the UE 510 is a transmitting UE and the UE 505 is a receiving UE. As mentioned above, in some aspects, each transmitting UE associated with a communication link can select a respective DC location, such that the DC location for transmissions from the UE 505 to the UE 510 can be different than the DC location for transmissions from the UE 510 to the UE 505.

As shown by reference number 545, in some aspects, the UE 510 may select a second DC location for a transmission by the UE 510. For example, the UE 510 may select the DC location as described in connection with reference number 525. As shown by reference number 550, in some aspects, the UE 510 may transmit, to the UE 505, information indicating the second DC location. For example, the UE 510 may transmit the information indicating the second DC location as described in connection with reference number 530. In some aspects, the UE 510 may receive an acknowledgment from the UE 505 (not shown). As shown by reference number 555, the UE 510 may transmit a sidelink communication to the UE 505 based at least in part on the second DC location. For example, the UE 510 may transmit, and the UE 505 may receive, the sidelink communication as described in connection with reference number 530. In this way, different UEs can select different DC locations for respective transmissions, which improves flexibility, reduces overhead associated with configuring a large number of possible DC locations, and improves throughput and reliability of sidelink communications. Furthermore, using the techniques and apparatuses described herein, compatibility for multiple carriers and multiple BWPs on a carrier is improved.

As indicated above, FIG. 5 is provided as an example. Other examples may differ from what is described with regard to FIG. 5.

Figure 6:
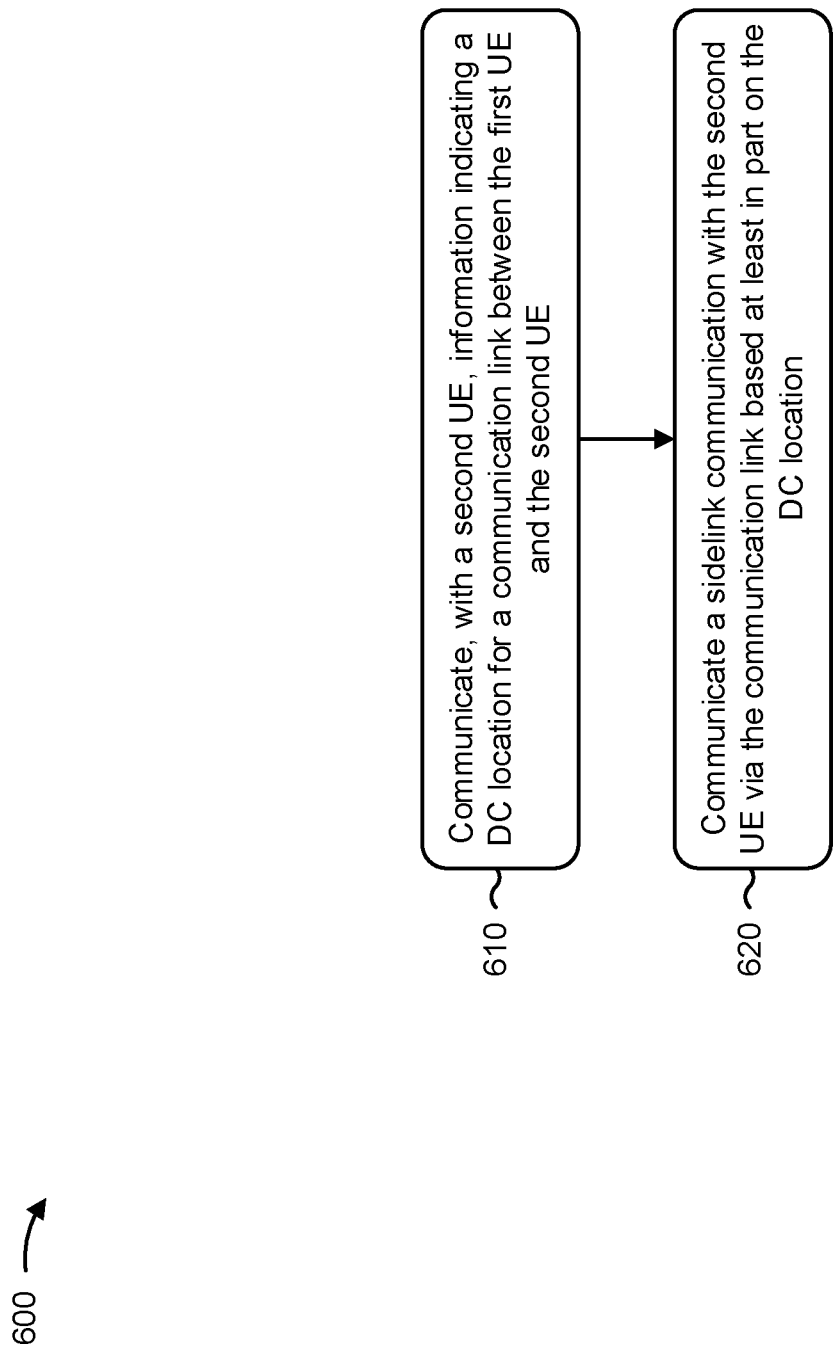
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where a first UE (e.g., UE 120, UE 305, UE 405, UE 410, UE 505, UE 510) performs operations associated with direct current location reporting in the sidelink. Example process 600 involves the first UE and a second UE (e.g., UE 120, UE 305, UE 405, UE 410, UE 505, UE 510). In some aspects, the first UE is a transmitting UE and the second UE is a receiving UE. In some aspects, the first UE is a receiving UE and the second UE is a transmitting UE.

As shown in FIG. 6, in some aspects, process 600 may include communicating, with a second UE, information indicating a DC location for a communication link between the first UE and the second UE (block 610). For example, the UE (e.g., using communication manager 140, transmission component 704, or reception component 702, depicted in FIG. 7) may communicate, with a second UE, information indicating a DC location for a communication link between the first UE and the second UE, as described above. In some aspects, the communication may include the first UE transmitting the information indicating the DC location to the second UE, as described in connection with reference numbers 530 and 550 of FIG. 5. In some aspects, the communication may include the first UE receiving the information indicating the DC location from the second UE, as also described in connection with reference numbers 530 and 550 of FIG. 5.

As further shown in FIG. 6, in some aspects, process 600 may include communicating a sidelink communication with the second UE via the communication link based at least in part on the DC location (block 620). For example, the UE (e.g., using communication manager 140, transmission component 704, and/or reception component 702, depicted in FIG. 7) may communicate a sidelink communication with the second UE via the communication link based at least in part on the DC location, as described above. In some aspects, the communication may include the first UE transmitting the sidelink communication to the second UE, as described in connection with reference numbers 540 and 555 of FIG. 5. In some aspects, the communication may include the first UE receiving the sidelink communication from the second UE, as also described in connection with reference numbers 540 and 555 of FIG. 5.

Process 600 may include additional aspects, such as any single aspect or any combination of aspects described below and/or in connection with one or more other processes described elsewhere herein.

In a first aspect, the DC location is indicated per sidelink bandwidth part or per sidelink carrier (e.g., as described above in connection with reference number 530). Thus, the techniques described herein provide increased flexibility with regard to DC location relative to configuring a common DC location for all UEs associated with a carrier or BWP.

In a second aspect, alone or in combination with the first aspect, the DC location is associated with a set of sidelink carriers that includes a first sidelink carrier and a second sidelink carrier.

In a third aspect, alone or in combination with one or more of the first and second aspects, process 600 includes identifying that the first sidelink carrier and the second sidelink carrier are configured for sidelink communication with the second UE, and identifying that the DC location is in the first sidelink carrier, wherein the information indicating the DC location indicates that the DC location is inside the first sidelink carrier and outside the second sidelink carrier. In a fourth aspect, alone or in combination with the third aspect, the sidelink communication to the second UE is transmitted on the first sidelink carrier and the second sidelink carrier is associated with a third UE, wherein the information indicating the DC location indicates that the DC location is in the first sidelink carrier, and the process 600 further comprises transmitting, to the third UE, information indicating that the DC location is outside of the second sidelink carrier. Thus, the techniques described herein provide selection of a DC location for multiple sidelink carriers, which reduces overhead relative to explicitly configuring DC locations for each combination of sidelink carriers.

In a fifth aspect, alone or in combination with one or more of the first through fourth aspects, the information indicating the DC location is communicated via sidelink radio resource control signaling or sidelink medium access control signaling.

In a sixth aspect, alone or in combination with one or more of the first through fifth aspects, the DC location is a first DC location associated with the first UE, and wherein the process 600 further comprises receiving, from the second UE, information indicating a second DC location associated with the second UE, wherein the first DC location is configured for a communication from the first UE to the second UE and the second DC location is configured for a communication from the second UE to the first UE.

In a seventh aspect, alone or in combination with one or more of the first through sixth aspects, the sidelink communication is a unicast or managed groupcast communication (as described in more detail in connection with reference number 525 of FIG. 5). Thus, a UE can select an appropriate DC location for a sidelink communication, such as associated with an RRC connection with another UE, which may be more suitable than a common DC location configured by the network.

In an eighth aspect, alone or in combination with one or more of the first through seventh aspects, process 600 includes receiving a configuration of a common DC location from a base station, wherein the common DC location is within a sidelink carrier of the first UE and the second UE, and wherein the DC location communicated with the second UE is the common DC location based at least in part on receiving the configuration of the common DC location from the base station. In this way, if the base station configures a DC location in a sidelink carrier that is usable by the first UE and the second UE, the first UE may use the DC location in the sidelink carrier, which provides the network with the option of configuring a DC location for the first UE (or not).

In a ninth aspect, alone or in combination with one or more of the first through eighth aspects, process 600 includes receiving a no DC location configuration or an undefined DC location configuration from a base station, wherein communicating information indicating the DC location is based at least in part on receiving the no DC location configuration or the undefined DC location configuration. For example, if the first UE does not receive a DC location configuration (e.g., receives no DC location configuration) or receives an undefined (e.g., undetermined) DC location from the base station, the first UE may select a DC location for the sidelink communication.

In a tenth aspect, alone or in combination with one or more of the first through ninth aspects, the DC location is a first DC location associated with a unicast transmission or the communication link, and process 600 includes receiving, from a base station, a configuration of a second DC location associated with a broadcast communication or a groupcast communication. Thus, the base station can configure a DC location for a broadcast or a groupcast communication (such as a groupcast directed to a group of UEs not known to the first UE), which is beneficial in a situation where the first UE and the second UE are not associated with an established connection with each other.

In an eleventh aspect, alone or in combination with one or more of the first through tenth aspects, the first UE supports multiple carriers, wherein each of the multiple carriers is configured with a respective DC location, and wherein the DC location for the communication link is selected from the respective DC locations (as described in connection with reference number 525).

In a twelfth aspect, alone or in combination with one or more of the first through eleventh aspects, communicating the sidelink communication with the second UE via the communication link based at least in part on the DC location further comprises transmitting the sidelink communication such that a demodulation reference signal or a phase tracking reference signal is non-overlapped with a frequency resource associated with the DC location (as described in more detail in connection with reference number 540).

In a thirteenth aspect, alone or in combination with one or more of the first through twelfth aspects, communicating the information indicating the DC location is based at least in part on establishing a radio resource control connection with the second UE. For example, the radio resource control connection may be a PC5 RRC connection, and the establishment may include initial connection or reconnection, as described above.

In a fourteenth aspect, alone or in combination with one or more of the first through thirteenth aspects, communicating the information indicating the DC location is based at least in part on a bandwidth part switch associated with one or more sidelink carriers of the first UE (as described in connection with reference number 530).

In a fifteenth aspect, alone or in combination with one or more of the first through fourteenth aspects, communicating the information indicating the DC location is based at least in part on a bandwidth part reconfiguration of the first UE (as described in connection with reference number 530).

In a sixteenth aspect, alone or in combination with one or more of the first through fifteenth aspects, process 600 includes receiving an acknowledgment regarding the information indicating the DC location, wherein communicating the sidelink communication is based at least in part on receiving the acknowledgment (as described in connection with reference number 535).

In a seventeenth aspect, alone or in combination with one or more of the first through sixteenth aspects, the sidelink communication is communicated at least a length of time after the information indicating the DC location is transmitted (as described above).

In an eighteenth aspect, alone or in combination with one or more of the first through seventeenth aspects, the DC location is a first DC location, and process 600 includes receiving, from the second UE, a communication using a network-configured DC location based at least in part on the first UE not having received information indicating a second DC location from the second UE. For example, the network-configured DC location may be configured by a base station or preconfigured, as described above.

In a nineteenth aspect, alone or in combination with one or more of the first through eighteenth aspects, the DC location is a first DC location, and process 600 includes receiving, from the second UE, a communication based at least in part on an undefined DC location, wherein receiving the communication based at least in part on the undefined DC location is based at least in part on the first UE not having received information indicating a second DC location from the second UE.

In a twentieth aspect, alone or in combination with one or more of the first through nineteenth aspects, the DC location is a first DC location, and process 600 includes receiving, from the second UE, a communication based at least in part on a second DC location outside a sidelink carrier associated with the second UE, wherein receiving the communication based at least in part on the second DC location is based at least in part on the first UE not having received information indicating the second DC location from the second UE.

In a twenty-first aspect, alone or in combination with one or more of the first through twentieth aspects, the information indicating the DC location indicates at least one of that the DC location is within a carrier of the communication link and a subcarrier index of the DC location within the carrier, that the DC location is outside of the carrier of the communication link, that the DC location is outside of each carrier of a set of carriers of the communication link, or that the DC location is undefined.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
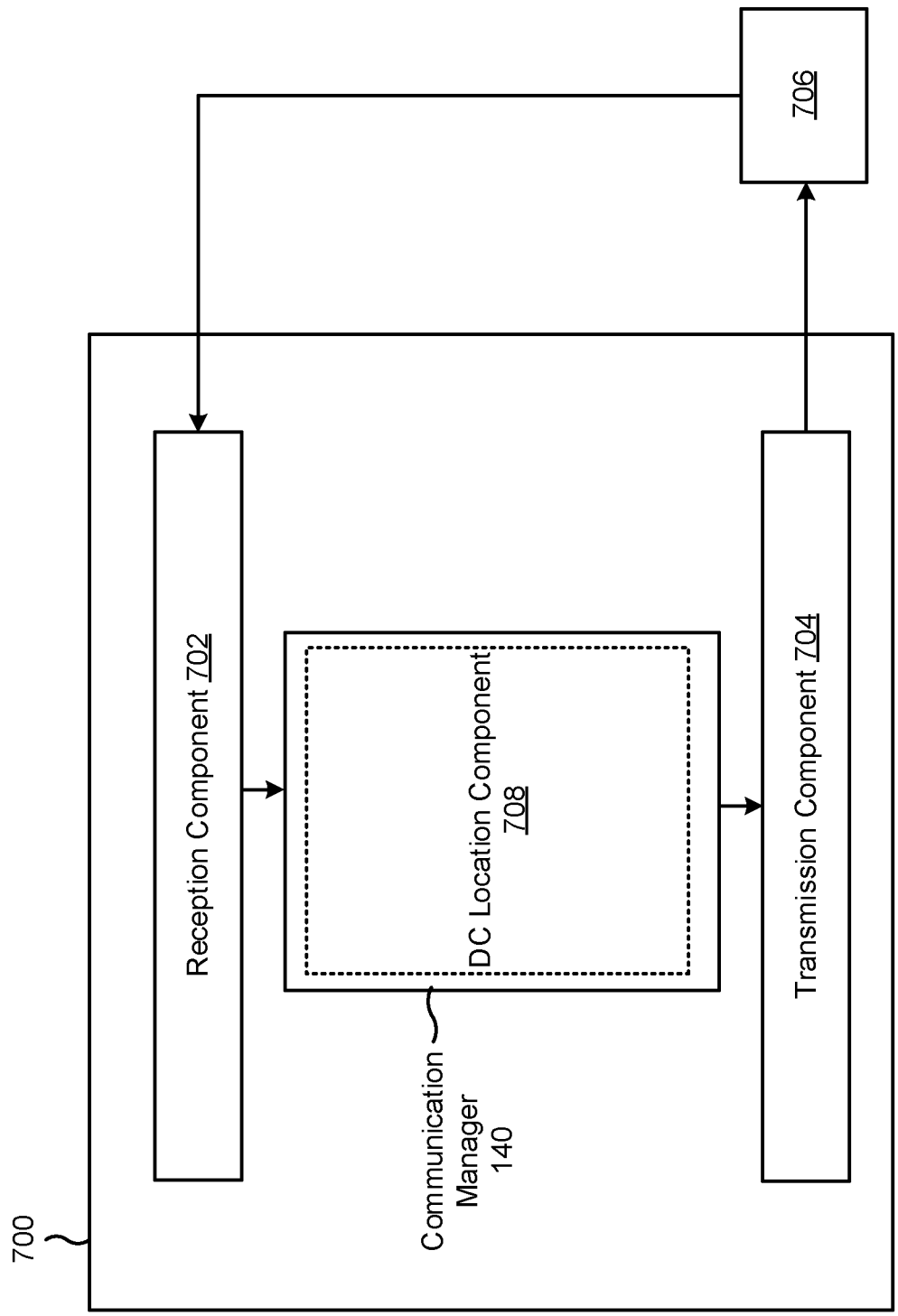
FIG. 7 is a diagram of an example apparatus for wireless communication, in accordance with the present disclosure.

FIG. 7 is a diagram of an example apparatus 700 for wireless communication, in accordance with the present disclosure. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include a DC location component 708, among other examples.

In some aspects, the apparatus 700 may be configured to perform one or more operations described herein in connection with FIGS. 3-5. Additionally, or alternatively, the apparatus 700 may be configured to perform one or more processes described herein, such as process 600 of FIG. 6, or a combination thereof. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The transmission component 704 or the reception component 702 may communicate, with a second UE, information indicating a DC location for a communication link between the first UE and the second UE. The transmission component 704, the reception component 702, or the DC location component 708 may communicate a sidelink communication with the second UE via the communication link based at least in part on the DC location. For example, the DC location component 708 may configure one or more reference signals not to overlap with the DC location, may configure filtering in association with the DC location, or the like.

The reception component 702 may receive a configuration of a common DC location from a base station.

The reception component 702 may receive a no DC location configuration or an undefined DC location configuration from a base station.

The reception component 702 may receive an acknowledgment regarding the information indicating the DC location, wherein communicating the sidelink communication is based at least in part on receiving the acknowledgment.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a first user equipment (UE), comprising: communicating, with a second UE, information indicating a direct current (DC) location for a communication link between the first UE and the second UE; and communicating a sidelink communication with the second UE via the communication link based at least in part on the DC location.

Aspect 2: The method of Aspect 1, wherein the DC location is indicated per sidelink bandwidth part or per sidelink carrier.

Aspect 3: The method of Aspect 1, wherein the DC location is associated with a set of sidelink carriers that includes a first sidelink carrier and a second sidelink carrier.

Aspect 4: The method of Aspect 3, further comprising: identifying that the first sidelink carrier and the second sidelink carrier are configured for sidelink communication with the second UE; and identifying that the DC location is in the first sidelink carrier, wherein the information indicating the DC location indicates that the DC location is inside the first sidelink carrier and outside the second sidelink carrier.

Aspect 5: The method of Aspect 3, wherein the sidelink communication to the second UE is transmitted on the first sidelink carrier and the second sidelink carrier is associated with a third UE, wherein the information indicating the DC location indicates that the DC location is in the first sidelink carrier, and wherein the method further comprises: transmitting, to the third UE, information indicating that the DC location is outside of the second sidelink carrier.

Aspect 6: The method of any of Aspects 1-5, wherein the information indicating the DC location is communicated via sidelink radio resource control signaling or sidelink medium access control signaling.

Aspect 7: The method of any of Aspects 1-6, wherein the DC location is a first DC location associated with the first UE, and wherein the method further comprises: receiving, from the second UE, information indicating a second DC location associated with the second UE, wherein the first DC location is configured for a communication from the first UE to the second UE and the second DC location is configured for a communication from the second UE to the first UE.

Aspect 8: The method of any of Aspects 1-7, wherein the sidelink communication is a unicast or managed groupcast communication.

Aspect 9: The method of any of Aspects 1-8, further comprising: receiving a configuration of a common DC location from a base station, wherein the common DC location is within a sidelink carrier of the first UE and the second UE, and wherein the DC location communicated with the second UE is the common DC location based at least in part on receiving the configuration of the common DC location from the base station.

Aspect 10: The method of any of Aspects 1-9, further comprising: receiving a no DC location configuration or an undefined DC location configuration from a base station, wherein communicating information indicating the DC location is based at least in part on receiving the no DC location configuration or the undefined DC location configuration.

Aspect 11: The method of any of Aspects 1-10, wherein the DC location is a first DC location associated with a unicast transmission or the communication link, wherein the method further comprises: receiving, from a base station, a configuration of a second DC location associated with a broadcast communication or a groupcast communication.

Aspect 12: The method of any of Aspects 1-11, wherein the first UE supports multiple carriers, wherein each of the multiple carriers is configured with a respective DC location, and wherein the DC location for the communication link is selected from the respective DC locations.

Aspect 13: The method of any of Aspects 1-12, wherein communicating the sidelink communication with the second UE via the communication link based at least in part on the DC location further comprises: transmitting the sidelink communication such that a demodulation reference signal or a phase tracking reference signal is non-overlapped with a frequency resource associated with the DC location.

Aspect 14: The method of any of Aspects 1-13, wherein communicating the information indicating the DC location is based at least in part on establishing a radio resource control connection with the second UE.

Aspect 15: The method of any of Aspects 1-14, wherein communicating the information indicating the DC location is based at least in part on a bandwidth part switch associated with one or more sidelink carriers of the first UE.

Aspect 16: The method of any of Aspects 1-15, wherein communicating the information indicating the DC location is based at least in part on a bandwidth part reconfiguration of the first UE.

Aspect 17: The method of any of Aspects 1-16, further comprising: receiving an acknowledgment regarding the information indicating the DC location, wherein communicating the sidelink communication is based at least in part on receiving the acknowledgment.

Aspect 18: The method of any of Aspects 1-17, wherein the sidelink communication is communicated at least a length of time after the information indicating the DC location is transmitted.

Aspect 19: The method of any of Aspects 1-18, wherein the DC location is a first DC location, and wherein the method further comprises: receiving, from the second UE, a communication using a network-configured DC location based at least in part on the first UE not having received information indicating a second DC location from the second UE.

Aspect 20: The method of any of Aspects 1-19, wherein the DC location is a first DC location, and wherein the method further comprises: receiving, from the second UE, a communication based at least in part on an undefined DC location, wherein receiving the communication based at least in part on the undefined DC location is based at least in part on the first UE not having received information indicating a second DC location from the second UE.

Aspect 21: The method of any of Aspects 1-20, wherein the DC location is a first DC location, and wherein the method further comprises: receiving, from the second UE, a communication based at least in part on a second DC location outside a sidelink carrier associated with the second UE, wherein receiving the communication based at least in part on the second DC location is based at least in part on the first UE not having received information indicating the second DC location from the second UE.

Aspect 22: The method of any of Aspects 1-21, wherein the information indicating the DC location indicates at least one of: that the DC location is within a carrier of the communication link and a subcarrier index of the DC location within the carrier, that the DC location is outside of the carrier of the communication link, that the DC location is outside of each carrier of a set of carriers of the communication link, or that the DC location is undefined.

Aspect 23: An apparatus for wireless communication at a device, comprising a processor; memory coupled with the processor; and instructions stored in the memory and executable by the processor to cause the apparatus to perform the method of one or more of Aspects 1-22.

Aspect 24: A device for wireless communication, comprising a memory and one or more processors coupled to the memory, the one or more processors configured to perform the method of one or more of Aspects 1-22.

Aspect 25: An apparatus for wireless communication, comprising at least one means for performing the method of one or more of Aspects 1-22.

Aspect 26: A non-transitory computer-readable medium storing code for wireless communication, the code comprising instructions executable by a processor to perform the method of one or more of Aspects 1-22.

Aspect 27: A non-transitory computer-readable medium storing a set of instructions for wireless communication, the set of instructions comprising one or more instructions that, when executed by one or more processors of a device, cause the device to perform the method of one or more of Aspects 1-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first user equipment (UE), comprising:
   one or more memories; and
   one or more processors, coupled to the one or more memories, configured to:
      communicate, with a second UE, information indicating a direct current (DC) location for a communication link between the first UE and the second UE, wherein the DC location is one or more of:
         associated with a plurality of sidelink carriers,
         selected from DC locations corresponding to multiple carriers supported by the first UE,
         or
         associated with a frequency resource that is non-overlapped with a demodulation reference signal or a phase tracking reference signal; and
      communicate a sidelink communication with the second UE via the communication link based at least in part on the DC location.

2. The apparatus of claim 1, wherein the DC location is indicated per sidelink bandwidth part or per sidelink carrier.

3. The apparatus of claim 1, wherein the DC location is associated with the plurality of sidelink carriers, and
   wherein the plurality of sidelink carriers include a first sidelink carrier and a second sidelink carrier.

4. The apparatus of claim 3, wherein the one or more processors are further configured to:
   identify that the first sidelink carrier and the second sidelink carrier are configured for sidelink communication with the second UE; and
   identify that the DC location is in the first sidelink carrier, wherein the information indicating the DC location indicates that the DC location is inside the first sidelink carrier and outside the second sidelink carrier.

5. The apparatus of claim 3, wherein the sidelink communication to the second UE is transmitted on the first sidelink carrier and the second sidelink carrier is associated with a third UE, wherein the information indicating the DC location indicates that the DC location is in the first sidelink carrier, and
   wherein the one or more processors are further configured to:
      transmit, to the third UE, information indicating that the DC location is outside of the second sidelink carrier.

6. The apparatus of claim 1, wherein the information indicating the DC location is communicated via sidelink radio resource control signaling or sidelink medium access control signaling.

7. The apparatus of claim 1, wherein the DC location is a first DC location associated with the first UE, and
   wherein the one or more processors are further configured to:
      receive, from the second UE, information indicating a second DC location associated with the second UE, wherein the first DC location is configured for a communication from the first UE to the second UE and the second DC location is configured for a communication from the second UE to the first UE.

8. The apparatus of claim 1, wherein the sidelink communication is a unicast or managed groupcast communication.

9. The apparatus of claim 1, wherein the one or more processors are further configured to:
receive a configuration of a common DC location,
wherein the common DC location is within a sidelink carrier of the first UE and the second UE, and
wherein the DC location is the common DC location.

10. The apparatus of claim 1, wherein the one or more processors are further configured to:
receive a no DC location configuration or an undefined DC location configuration,
wherein, to communicate the information indicating the DC location, the one or more processors are configured to:
communicate the information indicating the DC location based at least in part on receiving the no DC location configuration or the undefined DC location configuration.

11. The apparatus of claim 1,
wherein the DC location is a first DC location associated with a unicast transmission or the communication link, and
wherein the one or more processors are further configured to:
receive a configuration of a second DC location associated with a broadcast communication or a groupcast communication.

12. The apparatus of claim 1,
wherein the first UE supports the multiple carriers, and
wherein the DC location for the communication link is selected from the DC locations corresponding to the multiple carriers supported by the first UE.

13. The apparatus of claim 1, wherein the one or more processors, to communicate the sidelink communication with the second UE via the communication link based at least in part on the DC location, are configured to:
transmit the sidelink communication such that the demodulation reference signal or the phase tracking reference signal is non-overlapped with the frequency resource associated with the DC location.

14. The apparatus of claim 1, wherein, to communicate the information indicating the DC location, the one or more processors are configured to:
communicate, based at least in part on establishing a radio resource control connection with the second UE, the information indicating the DC location.

15. The apparatus of claim 1, wherein, to communicate the information indicating the DC location, the one or more processors are configured to:
communicate, based at least in part on a bandwidth part switch associated with one or more sidelink carriers of the first UE, the information indicating the DC location.

16. The apparatus of claim 1, wherein, to communicate the information indicating the DC location, the one or more processors are configured to:
communicate, based at least in part on a bandwidth part reconfiguration of the first UE, the information indicating the DC location.

17. The apparatus of claim 1,
wherein the one or more processors are further configured to:
receive an acknowledgment regarding the information indicating the DC location, and
wherein, to communicate the sidelink communication, the one or more processors are configured to:
communicate the sidelink communication based at least in part on receiving the acknowledgment.

18. The apparatus of claim 1, wherein, to communicate the sidelink communication, the one or more processors are configured to:
communicate the sidelink communication at least a length of time after the information indicating the DC location is transmitted.

19. The apparatus of claim 1,
wherein the DC location is a first DC location, and
wherein the one or more processors are further configured to:
receive, from the second UE, a communication using a network-configured DC location based at least in part on the first UE not having received information indicating a second DC location from the second UE.

20. The apparatus of claim 1,
wherein the DC location is a first DC location, and
wherein the one or more processors are further configured to:
receive, from the second UE and based at least in part on the first UE not having received information indicating a second DC location from the second UE, a communication based at least in part on an undefined DC location.

21. The apparatus of claim 1,
wherein the DC location is a first DC location, and
wherein the one or more processors are further configured to:
receive, from the second UE and based at least in part on the first UE not having received information indicating a second DC location from the second UE, a communication based at least in part on the second DC location outside a sidelink carrier associated with the second UE.

22. The apparatus of claim 1, wherein the information indicating the DC location indicates at least one of:
that the DC location is within a carrier of the communication link and a subcarrier index of the DC location within the carrier,
that the DC location is outside of the carrier of the communication link,
that the DC location is outside of each carrier of a set of carriers of the communication link, or
that the DC location is undefined.

23. A method of wireless communication performed by a first user equipment (UE), comprising:
communicating, with a second UE, information indicating a direct current (DC) location for a communication link between the first UE and the second UE,
wherein the DC location is one or more of:
associated with a plurality of sidelink carriers,
selected from DC locations corresponding to multiple carriers supported by the first UE,
or
associated with a frequency resource that is non-overlapped with a demodulation reference signal or a phase tracking reference signal; and communicating a sidelink communication with the second UE via the communication link based at least in part on the DC location.

24. The method of claim 23, wherein the DC location is indicated per sidelink bandwidth part or per sidelink carrier.

25. The method of claim 23, wherein the DC location is associated with the plurality of sidelink carriers, and
wherein the plurality of sidelink carriers include a first sidelink carrier and a second sidelink carrier.

26. The method of claim 23, wherein the DC location is a first DC location associated with the first UE, and
wherein the method further comprises:
receiving, from the second UE, information indicating a second DC location associated with the second UE, wherein the first DC location is configured for a communication from the first UE to the second UE and the second DC location is configured for a communication from the second UE to the first UE.

27. The method of claim 23, wherein communicating the sidelink communication with the second UE via the communication link based at least in part on the DC location comprises:
transmitting the sidelink communication such that the demodulation reference signal or the phase tracking reference signal is non-overlapped with the frequency resource associated with the DC location.

28. The method of claim 23, wherein the information indicating the DC location indicates at least one of:
that the DC location is within a carrier of the communication link and a subcarrier index of the DC location within the carrier,
that the DC location is outside of the carrier of the communication link,
that the DC location is outside of each carrier of a set of carriers of the communication link, or
that the DC location is undefined.

29. A non-transitory computer-readable medium storing a set of instructions for wireless communication, the set of instructions comprising:
one or more instructions that, when executed by one or more processors of a first user equipment (UE), cause the UE to:
communicate, with a second UE, information indicating a direct current (DC) location for a communication link between the first UE and the second UE,
wherein the DC location is one or more of:
associated with a plurality of sidelink carriers,
selected from DC locations corresponding to multiple carriers supported by the first UE,
or
associated with a frequency resource that is non-overlapped with a demodulation reference signal or a phase tracking reference signal; and
communicate a sidelink communication with the second UE via the
communication link based at least in part on the DC location.

30. An apparatus for wireless communication, comprising:
means for communicating, with a user equipment (UE), information indicating a direct current (DC) location for a communication link between the apparatus and the UE,
wherein the DC location is one or more of:
associated with a plurality of sidelink carriers,
selected from DC locations corresponding to multiple carriers supported by the apparatus,
or
associated with a frequency resource that is non-overlapped with a demodulation reference signal or a phase tracking reference signal; and
means for communicating a sidelink communication with the UE via the communication link based at least in part on the DC location.

* * * * *